US012744869B2

(12) United States Patent
Eck et al.

(10) Patent No.: US 12,744,869 B2
(45) Date of Patent: Sep. 22, 2026

(54) SYSTEM AND METHOD FOR PROJECTION MAPPING ACTUATABLE OBJECTS

(71) Applicant: Universal City Studios LLC, Universal City, CA (US)

(72) Inventors: Timothy J. Eck, Windermere, FL (US); Anthony Alexander Mecca, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 19/025,690

(22) Filed: Jan. 16, 2025

(65) Prior Publication Data

US 2026/0205563 A1 Jul. 16, 2026

(51) Int. Cl.

*H04N 9/31* (2006.01)
*G06T 7/292* (2017.01)
*G06T 7/73* (2017.01)

(52) U.S. Cl.

CPC .......... *H04N 9/3185* (2013.01); *G06T 7/292* (2017.01); *G06T 7/75* (2017.01); *H04N 9/3194* (2013.01); *G06T 2207/30196* (2013.01)

(58) Field of Classification Search

CPC .... H04N 9/3185; H04N 9/3194; G06T 7/292; G06T 7/75; G06T 2207/30196
USPC ........................................................ 348/744
See application file for complete search history.

(56) References Cited

U.S. PATENT DOCUMENTS 9,303,999 B2 4/2016 Hesch et al.
10,481,679 B2 11/2019 Sevostianov
10,535,153 B2 1/2020 Weising et al.
11,158,127 B2 * 10/2021 Mitchell .............. G01C 15/002
11,772,276 B2 10/2023 Mecca et al.
2017/0160546 A1 6/2017 Bull et al.
2021/0205999 A1 * 7/2021 Mecca ................. B25J 11/0015
2022/0051031 A1 2/2022 Li et al.
(Continued)

FOREIGN PATENT DOCUMENTS

WO 2023239802 A1 12/2023

OTHER PUBLICATIONS

PCT/US2026/010710 International Search Report and Written Opinion mailed Apr. 1, 2026.

*Primary Examiner* — John W Miller
*Assistant Examiner* — Omer Khalid
(74) *Attorney, Agent, or Firm* — Fletcher Yoder, P.C.

(57) ABSTRACT

Present embodiments provide a projection mapping system that includes multiple trackers and an actuatable object. The actuatable object may include multiple tracking cameras positioned on the actuatable object, such that the multiple tracking cameras are configured to detect optical signals of the multiple trackers and to generate tracking signals indicative of detection of the multiple trackers. Additionally, the projection mapping system includes an object controller configured to transmit the tracking signals, and receive instructions to actuate the actuatable object. Also, the projection mapping system includes a system controller configured to receive the tracking signals, determine a position of the actuatable object based on the tracking signals, and generate projection instructions based on the determined position. Also, the system includes a projector communicatively coupled to the system controller, such that the projector is configured to project images onto the actuatable object based on the projection instructions.

17 Claims, 5 Drawing Sheets

(56) References Cited

U.S. PATENT DOCUMENTS

| | | | |
|---|---|---|---|
| 2025/0005837 | A1 | 1/2025 | Russell, Jr. et al. |
| 2025/0278879 | A1 | 9/2025 | Ayala, Jr. et al. |

* cited by examiner

SYSTEM AND METHOD FOR PROJECTION MAPPING ACTUATABLE OBJECTS

BACKGROUND

The present disclosure relates generally to the field of projection mapping and motion tracking, for use in amusement parks, events, and attractions. More specifically, embodiments of the present disclosure relate to systems and methods for position and/or motion tracking of projection-mapped actuatable objects in relation to their surroundings in an amusement attraction.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain a variety of features and attractions that provide unique experiences to each park guest. Among the various features and attractions, actuatable objects may entertain park guests that are queued for or within a ride experience. Certain actuatable objects may be brought to life by projection mapping, which can provide augmentations or embellishments for the actuatable objects. For example, a particular actuatable object may be visually supplemented with a set of projected images, which may align with preprogrammed movements of the actuatable object. To ensure that the images adequately align with the preprogrammed movements of the actuatable object, a position and motion of the actuatable object may be tracked in relation to one or more surfaces within the entertainment venue. It may be beneficial to improve position and motion tracking of the actuatable object, and by extension the projection mapping of the images onto an external surface of the actuatable object, thereby further immersing the guests within a particular attraction, ride, or interactive experience.

SUMMARY

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In a non-limiting embodiment, a projection mapping system includes multiple trackers and an actuatable object. The actuatable object may include a frame, one or more actuators configured to actuate a portion of the actuatable object, and multiple sensors on or in the portion of the actuatable object and configured to move with the portion during actuation. Further, the multiple sensors include multiple tracking cameras positioned on a first surface of the portion of the actuatable object, such that the multiple tracking cameras are configured to detect optical signals of one or more of the multiple trackers and to generate tracking signals indicative of detection of the one or more of the plurality of trackers, an inertial measurement unit (IMU) sensor, such that the IMU sensor is coupled to the frame, and such that the IMU sensor is configured to generate an orientation signal in response to changes in orientation of the portion of the actuatable object, and a one-way optical sensor positioned one a second surface of the portion of the actuatable object and configured to generate a light signal indicative of light received at the second surface. Additionally, the projection mapping system includes an object controller configured to transmit signals from the plurality of sensors, such that the signals include the tracking signals, the orientation signal, and the light signal, and receive instructions to actuate the portion of the actuatable object. Also, the projection mapping system includes a system controller configured to receive the signals from the plurality of sensors, determine a position of the portion of the actuatable object based on the signals, and generate projection instructions based on the determined position, and a projector communicatively coupled to the system controller, such that the projector is configured to project images onto the second surface of the portion of the actuatable object based on the projection instructions.

In a non-limiting embodiment, an actuatable object includes a frame, one or more actuators configured to actuate a portion of the actuatable object, and multiple sensors on or in the portion of the actuatable object and configured to move with the portion during actuation. The multiple sensors include multiple tracking cameras positioned on a first surface of the portion of the actuatable object, such that the multiple tracking cameras are configured to detect optical signals of one or more of multiple trackers and to generate tracking signals, an inertial measurement unit (IMU) sensor, such that the IMU sensor is coupled to the frame and configured to generate an orientation signal in response to changes in orientation of the portion of the actuatable object, a one-way optical sensor positioned on a second surface of the portion of the actuatable object and configured to generate a light signal indicative of light received at the second surface, and a calibration sensor, such that the calibration sensor is configured to generate an additional orientation signal in response to changes in orientation of the portion of the actuatable object. Also, the actuatable object includes an object controller configured to transmit signals from the multiple sensors, the signals including the tracking signals, the orientation signal, and the light signal, and receive instructions to actuate the portion of the actuatable object.

In a non-limiting embodiment, a processor-implemented method includes receiving signals from a plurality of sensors mounted on an actuatable object, such that the multiple sensors include multiple tracking cameras configured to generate tracking signals, an inertial measurement unit (IMU) configured to generate an orientation signal, and a one-way optical sensor configured to generate light signals. Additionally, the processor-implemented method includes determining a position of a portion of the actuatable object, such that the determination is based on the received signals, and such that the multiple tracking signals of the received signals are based on a relationship between the tracking cameras and trackers mounted within an amusement attraction. Further, the processor-implemented method includes generating projection instructions based on the determined position and transmitting the projection instructions to a projector, such that the projector is configured to project images onto a surface of the actuatable object based on the projection instructions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
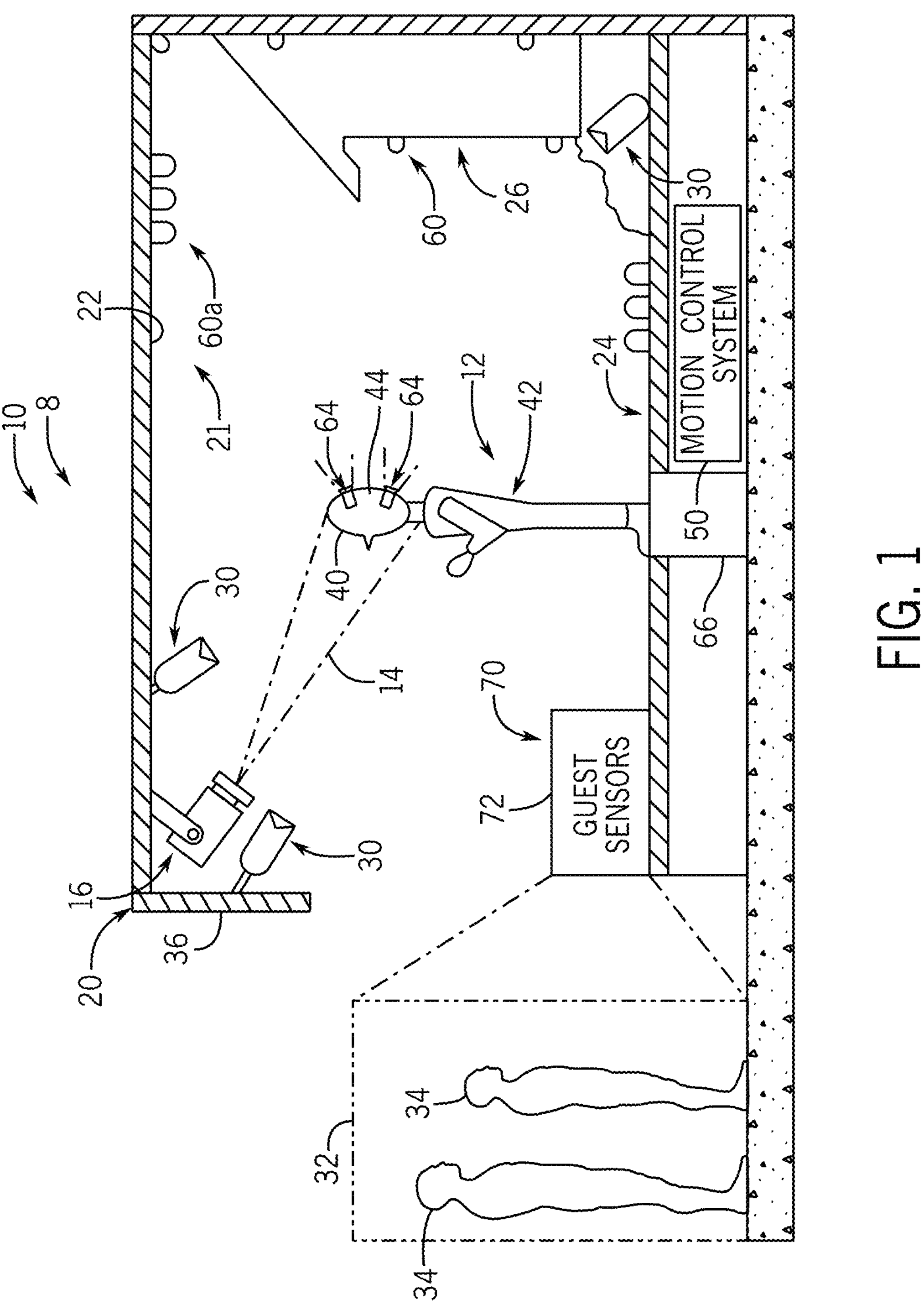
FIG. 1 is a schematic diagram illustrating an embodiment of a projection mapping system including a motion tracking system and a projection system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising, "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a projection mapping system for an amusement attraction, such as an attraction in which a projector of a projection system directs images onto an external surface of an actuatable object. The projection mapping system provides a dynamic and immersive experience to guests. For example, in certain cases, the actuatable object can be implemented as an animated figure, and the projection mapping provides additional surface details resembling a real person or character in a more realistic manner. In other cases, the actuatable object may be a prop, set piece, or otherwise appropriate object in a context of the immersive experience. In particular, by projection mapping onto the external surface of the actuatable object, the actuatable object may appear more lifelike than techniques that incorporate a display within a semi-transparent surface of an actuatable object, thereby generating an unnatural or ethereal glowing appearance. As discussed herein, the projection mapping system leverages "inside-out" motion tracking (e.g., via optical performance capture or optical motion capture) of the actuatable object to dynamically track the motion, position, and/or orientation of the actuatable object, and then generate and project images onto the external surface of the actuatable object. In the disclosed embodiments, the actuatable object carries the optical capture devices (e.g., cameras), and the fixed surfaces in the environment have fixed-position optical trackers that selectively emit signals that are captured by the capture devices. This is in contrast to projection mapping techniques in which cameras are at fixed positions in the environment, and the optical trackers move with the actuatable object.

As an additional benefit, present embodiments position the projector external to the actuatable object, thereby enabling the actuatable object to house more complex or numerous actuators, which may otherwise block or physically interfere with traditional internal projection techniques. In more detail, to enable the motion and positional tracking of the actuatable object, the actuatable object may be fitted with tracking cameras configured to discern movements, positions, and orientations of the actuatable object relative to multiple trackers disposed on multiple surfaces of the venue (e.g., amusement park attraction, theatre, commercial/industrial setting, etc.). As mentioned above, the tracking cameras may be disposed within the actuatable object in portions of the actuatable object previously configured to house traditional internal projectors. The tracking cameras disposed on the actuatable object may be configured to focus on the multiple trackers positioned within the amusement park attraction. In utilizing the tracking cameras and the multiple trackers, the movements, positions, and orientations of the actuatable object may be tracked in real-time via optical performance capture or optical motion capture. In certain embodiments, the actuatable object may include sensors and actuators configured to measure the position, motion, and/or orientation in combination or instead of the tracking cameras and trackers. In some embodiments, an object controller may collect and receive data from the tracking cameras, sensors, and actuators, and transmit the data and signals to the media control system.

As illustrated in FIG. 1, a projection mapping system 8 of an amusement attraction 10 includes an actuatable object 12 that receives images 14 (e.g., projected content) from a projector 16 (e.g., external projector, optical projector with lens) of a media control system 20. In the illustrated embodiment, the amusement attraction 10 is a show set having multiple surfaces 21, including a stage ceiling 22, a stage floor 24, and scenery objects 26 disposed between the stage ceiling 22 and the stage floor 24. The show set may also include any suitable stage lighting devices 30, such as the illustrated lighting instruments or devices. From a guest area 32 of the amusement attraction 10, multiple guests 34 may view and/or interact with the actuatable object 12, in accordance with the present techniques. Although illustrated as within a stage-type environment, it should be understood that the projection mapping system 8 may be utilized to entertain guests 34 in any suitable environment, such as a dark ride, an outdoor arena, an environment adjacent to a ride path of a ride vehicle carrying the guests 34, and so forth. Further, while the actuatable object 12 is illustrated as an animated figure (e.g., a humanoid figure), it should be understood that the disclosed embodiments may be used in conjunction with actuatable objects 12 configured as any element of an immersive environment.

Notably, the projector 16 is external to the actuatable object 12, thereby enabling an enclosed volume within the actuatable object 12 to be utilized to house components other than the projector 16, such as certain actuation, calibration, and sensing systems discussed in more detail below. In the illustrated embodiment, the projector 16 is disposed in front of the actuatable object 12 and obstructed from sight of the guests 34 by an overhang 36 of the stage ceiling 22. It should be recognized that the overhang 36 may alternatively be a curtain or that the amusement attraction 10 may take any other suitable form for enabling the guests 34 to view the actuatable object 12, but not be able to view the projector 16. In other embodiments, the projector 16 may be positioned behind the guests 34. In any case, the projector 16 directs the images 14 onto an external surface 40 of a body of the actuatable object 12, which corresponds to a head portion 44 of the actuatable object 12, in the present embodiment. The media control system 20 may therefore deliver realistic and engaging textures to the head portion 44 from a concealed location, thereby providing an immersive and interactive experience to the guests 34. Indeed, as previously mentioned, the media control system 20 of the projection mapping system 8 enables the actuatable object 12 to appear more lifelike than an actuatable object with internal projection, because the media control system 20 does not produce an internal, unnatural glow of the actuatable object 12 that an internally-positioned projector of certain actuatable objects may generate.

As recognized herein, the actuatable object 12 is part of a motion control system 50 (e.g., object control system, prop control system, etc.) that may operate independently of the media control system 20, in certain embodiments. For example, the motion control system 50 may receive interactive data from any suitable reactive and/or data sources to dynamically update the actuatable object 12. It should be understood that the motion control system 50 may instruct actuators to adjust the position of any suitable components of the amusement attraction 10 that may be viewable to the guests 34. Moreover, the motion control system 50 may control an actuatable motion device 66 (e.g., actuatable motion base) that is physically coupled to the actuatable object 12. The actuatable motion device 66 may be any suitable motion-generating assembly that may move (e.g., translate, rotate, revolve, gyrate, spin, etc.) the actuatable object 12 laterally, longitudinally, and/or vertically. However, it should be understood that, in other embodiments, the actuatable motion device 66 may be or include a suspension system and/or flying system that is coupled to the actuatable object 12 from above the stage floor 24. Therefore, the suspension system and/or flying system of the actuatable motion device 66 may include any suitable actuators designed to move the actuatable object 12 laterally, longitudinally, and/or vertically.

The projection mapping system 8 includes trackers 60 (e.g., trackable markers, anchor markers) that may be positioned on the surfaces (e.g., the stage ceiling 22, the stage floor 24, the scenery objects 26, etc.) of the amusement attraction 10, in the present embodiment. The trackers 60 enable one or more tracking cameras 64 disposed on the actuatable object 12 to sense or resolve a position and an orientation of the actuatable object 12 relative to the trackers 60. In certain embodiments, the tracking cameras 64 may utilize optical performance capture or optical motion capture technique to determine the positions, motion and/or orientation of the actuatable object 12 within the amusement attraction 10. Thus, as will be understood, the projector 16 may project the images 14 onto the actuatable object 12 in synchronization with an actual, current position and orientation of the actuatable object 12, without relying on position, velocity, and/or acceleration information from controllers or actuators of the actuatable object 12. However, it should be appreciated that in some embodiments, the media control system 20 may verify the positioning and operation of the projector 16 based on a sensor-derived and/or actuator-derived information from the actuatable object 12. In some embodiments, the trackers 60 may additionally or alternatively be placed on the overhang 36 of the stage, such that the trackers 60 may be obscured from view of the guests 34 in the guest area 32.

In some embodiments, the trackers 60 may be fixed to the various surfaces of the amusement attraction 10. In one embodiment, the trackers 60 may be the only components within the amusement attraction that are fixed in place, and the other components (e.g., actuatable object 12, projector 16, etc.) may be configured to translate within the amusement attraction 10. With this understanding in place, the projection mapping system 8 may utilize the fixed nature of the trackers 60 to determine spatial relationship of the actuatable object 12 within the 3D space of the amusement attraction, determine a relationship of the projected images 14 (e.g., 2D pixels) on the actuatable object 12 within the amusement attraction 10, and synthesize the determined relationships to appropriately projection map the projected images 14 onto the actuatable object 12. In some embodiments, the projection mapping system 8 may not include trackers 60, and the tracking cameras 64 may be configured to map the amusement attraction 10 (or entertainment venue, commercial/industrial location, etc.). In removing the trackers 60 from the projection mapping system, components (e.g., actuatable objects, props, etc.) may be reconfigured without an additional step of calibration taking place after the reconfiguration.

It should be understood that the projection mapping system 8 may include any suitable number of projectors 16, trackers 60, and tracking cameras 64. For example, more than one actuatable object 12 may be included within a single amusement attraction 10, and the projection mapping system 8 may include at least one projector 16 for each actuatable object 12. However, it is presently recognized that the particular infrastructure of the projection mapping system 8 enables any number of actuatable objects 12 that are moveable within an optical range of at least one tracker 60 and moveable within a projection cone of the at least one projector 16 to receive the images 14, without substantial re-design or reconfiguration of the projection mapping system 8. In other words, as additional actuatable objects 12 are provided with tracking cameras 64 and placed within the amusement attraction 10, the projection mapping system 8 may readily detect and accommodate the additional actuatable objects 12, in accordance with the present techniques. In other embodiments, multiple projectors 16 may be provided to deliver content to multiple sides of a single actuatable object 12, such as an actuatable object 12 that may be approached by guests 34 from multiple portions of the show set. Additionally, certain embodiments of the actuatable object 12 may include at least two tracking cameras 64 to resolve the relative positioning of the at least two tracking cameras 64 in relation to the trackers 60 for efficient tracking of the actuatable object 12, though it should be understood that changes in position of a single tracking camera 64 relative to a tracker 60 may also improve resolution of the position of the actuatable object 12.

The trackers 60 may be disposed on the multiple surfaces 21 (e.g., the stage ceiling 22, the stage floor 24, the scenery objects 26, etc.) to enable the tracking cameras 64 disposed on the actuatable object 12 to sense the position and orientation of the actuatable object 12 relative to the trackers 60. In certain embodiments, the tracking cameras 64 may detect pre-programmed motions (e.g., a pose, a spin, a translation, etc.) of the actuatable object 12 in relation to the trackers 60 disposed on the multiple surfaces 21 of the amusement attraction 10. The trackers 60 may be active devices, which may each emit an individualized signal to the tracking cameras 64. For example, the trackers 60 may emit infrared light, electromagnetic energy, or any other suitable signal that is detectable by the tracking cameras 64 (and, at least in some cases, undetectable by the guests 34). Alternatively, the trackers 60 may be passive devices (e.g., reflectors, retroreflectors, and/or pigmented portions) that may not directly emit a signal (e.g., may reflect received light) but that are detectable/resolvable by the tracking cameras 64 to precisely distinguish the passive devices from other portions of the multiple surfaces 21 of the amusement attraction 10.

In certain embodiments, the trackers 60 may be positioned in unique patterns on the surface 21 relative to one another that are associated with particular locations in the attraction 10. For example, a set of trackers 60*a* may have a unique spacing relative to one another. When these trackers 60*a* are sensed by the camera(s) 64, the detected signal can be resolved to the unique position of the trackers 60*a*.

Additionally, to establish a relationship between the projector(s) 16 of the projection system and the actuatable object 12, a calibration process is performed to enable the projector(s) 16 to project the images 14 onto the actuatable object 12. The calibration process may occur prior to operation of the amusement attraction 10. For example, the calibration process may occur before the week begins, each day before the amusement park opens, before each cycle of the amusement attraction 10, or any combination thereof. In an embodiment, the calibration process may occur (e.g., be triggered) following various events, such as in response to detected offsets between the projected images 14 and the actuatable object 12 (e.g., a sensor/imaging device detects the offsets), and this triggers the projection mapping system 8 to re-calibrate. In some embodiments, an operator visually observes the offsets, and provides an input to instruct the projection mapping system 8 to re-calibrate. In a non-limiting embodiment, one or more of the projector 16, actuatable object 12, or show elements may be "bumped," thereby leading the calibration process to be triggered. In certain embodiments, the calibration is dynamic and periodically updating, such that the calibration uses the most-recent past data set and updated data to track movement of the actuatable object 12.

FIG. 1 also illustrates an example of an interactive data source 70 that includes guest sensors 72. The guest sensors 72 may collect guest input from any guests 34 within the guest area 32. As recognized herein, the guest input is one form of interactive date that may be utilized to adaptively update the actuatable object 12 or the amusement attraction 10. The motion control system 50 may generate a response for the actuatable object 12 to perform based on the interactive data, and then instruct actuators of the actuatable object 12 to perform the response.

In the present embodiment, the one or more guest sensors 72 may collect guest input from any guests 34 within the guest area 32. As recognized herein, the guest input is one form of interactive data that may be utilized by the actuatable object 12 to adaptively response to a current state of the actuatable object 12 or amusement attraction 10. In the present embodiment, the guest sensors 72 may be any suitable devices that collect data from or regarding the guests 34 as the interactive data. The guest input collected by the guest sensors 72 may include active input and/or passive input, in certain embodiments. For example, the actuatable object 12 may respond to macroscopic gestures of the guests 34 by implementing gestural recognition or respond to words spoken by the guests 34 by implementing speech recognition. As passive input, the actuatable object 12 may respond to determined positions, orientations, features, and/or heights of the guests 34. Additionally, in certain embodiments, the guest sensors 72 include physical input devices, such as buttons, levers, knobs, and so forth. Moreover, it should be understood that the guest sensors 72 may collect any suitable visual data, auditory data, haptic input, data from interactive guest devices (e.g., smart phones, tablets), identification information from guest arm bands, input from interactive guest toys, and so forth.

Figure 2:
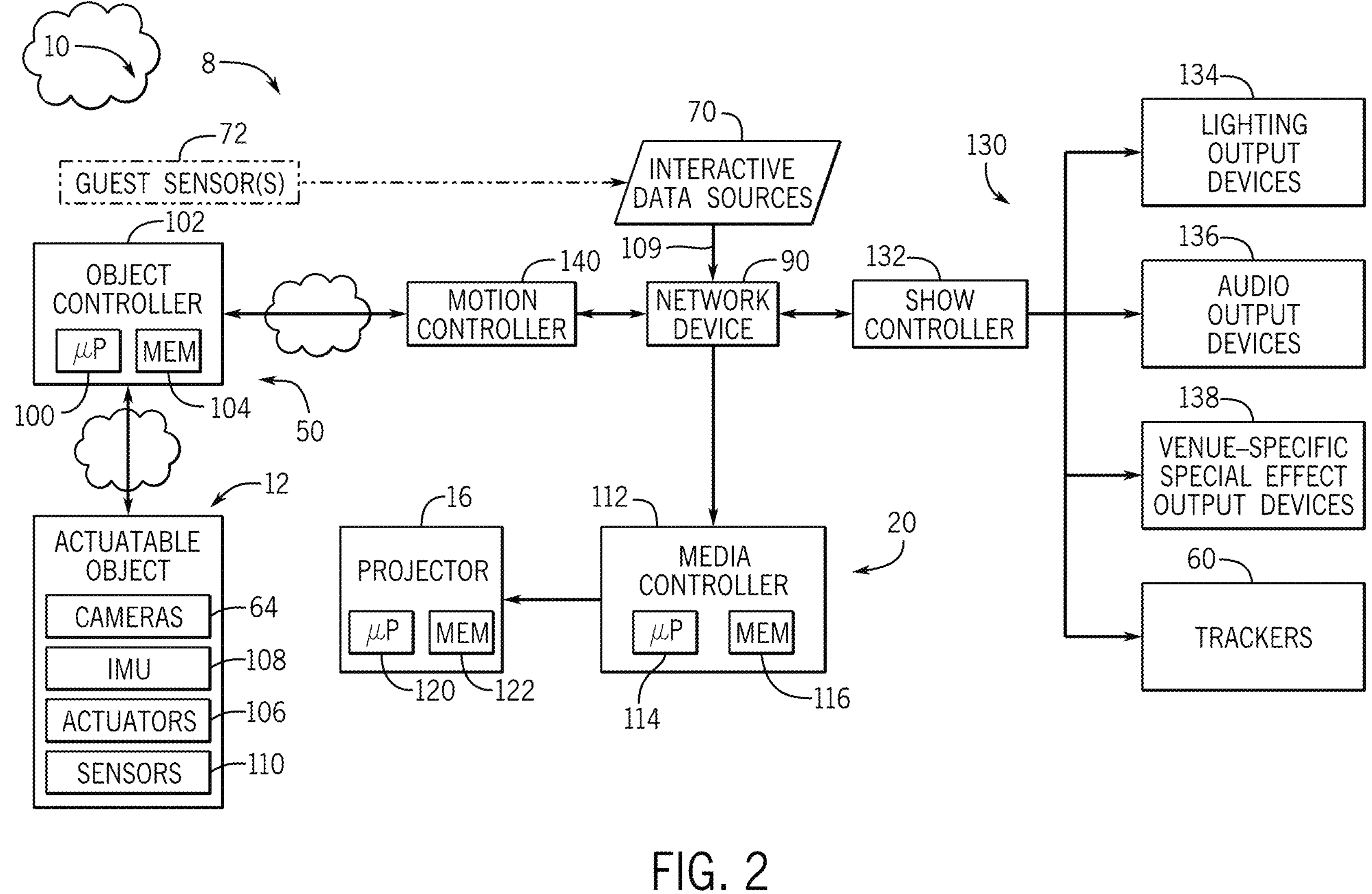
FIG. 2 is a block diagram of an embodiment of the projection mapping system of FIG. 1, in accordance with an embodiment of the present disclosure.

FIG. 2 is a block diagram of the projection mapping system 8 illustrating the media control system 20 that may operate to externally deliver content or images 14 to the actuatable object 12, without communicatively coupling to the motion control system 50. In other words, in some embodiments, the media control system 20 may not directly transmit to or receive communication signals from the motion control system 50. However, in other embodiments, the media control system 20 may directly transmit and/or receive communication signals from an object controller 102 of the actuatable object 12, or from other sources within the motion control system 50. As discussed below, the data sources 70 may be communicatively coupled upstream of both the media control system 20 and the motion control system 50, without intercommunication between the control systems 20, 50. A network device 90, such as a switch or a hub, may be communicatively coupled directly downstream of the data sources 70 to facilitate efficient communications between the data sources 70 and the control systems 20, 50. However, it should be understood that the network device 90 may be omitted, that multiple network devices 90 may be implemented, or that any other suitable data management device may be utilized to facilitate delivery of data from the data sources 70 to the control systems 20, 50.

The present embodiment of the projection mapping system 8 also includes a show control system 130 that coordinates additional output devices of the amusement attraction 10 based on the data sources 70. For example, a show controller 132 of the show control system 130 is communicatively coupled between the network device 90 and one or multiple lighting output devices 134, audio output devices 136, the trackers 60, and/or venue-specific special effect output devices 138 (e.g., fog machines, vibration generators, actuatable portions of the scenery objects 26). The lighting output devices 134 may include the stage lighting devices 30 (e.g., including the lighting instruments), as well as any other light-generating components of the amusement attraction 10. Additionally, the audio output devices 136 may include any suitable speakers or noise-generating devices that are designed to output sounds based on instructions from the show controller 132. As such, based on the interactive data 109 received from the data sources 70, the show controller 132 may coordinate a presentation of the output devices 134, 136, 138 to correspond with the interactive and/or reactive response of the actuatable object 12 and the media control system 20.

In the illustrated embodiment, the object controller 102 includes an object processor 100 and an object memory 104, which may collectively form all or a portion of an object controller 102 of the motion control system 50. In some embodiments, the object controller 102 may communicatively couple with the network device 90, thereby enabling the object controller 102 to receive and/or output communication signals relating to the position, motion, and/orientation of the actuatable object 12. Moreover, the actuatable object 12 may be fitted with suitable actuators 106, an inertial measurement unit (IMU) 108, and sensors 110, in addition to the tracking cameras 64 discussed previously. The actuators 106 may enable the actuatable object 12 to move (e.g., ambulate, translate, rotate, pivot, lip synchronize) in a realistic and life-emulating manner. The actuators 106 may include servo motors, hydraulic cylinders, linear actuators, and so forth that are each positioned and coupled to develop relative motion between respective portions of the actuatable object 12. For example, respective sets of actuators 106 may be positioned to move an arm of the actuatable object 12, manipulate a portion of the actuatable object 12 (e.g., the head portion 44, arm portion, torso portion, leg portion, etc.), move an articulating jaw of the head portion 44 of the actuatable object 12, and so forth. As mentioned above, the data sources 70 may include any suitable data source that provides a variable set of data over time as interactive data 109. For example, the guest sensors 72 may sense guest interactions and relay interactive data indicative of the guest interactions to the object controller 102 via the network device 90. In any case, based on the interactive data 109 from the data sources 70, the object controller 102 may instruct the actuators 106 to dynamically manipulate the actuatable object 12 to immediately respond and adapt to the interactive data 109.

To gather information regarding a current position and orientation of the actuatable object 12, the motion control system 50 leverages the tracking cameras 64, which are suitably positioned on the actuatable object 12, to identify or pinpoint the trackers 60, which are suitably positioned on the multiple surfaces 21 (e.g., the stage ceiling 22, the stage floor 24, the scenery objects 26, etc.) of the amusement attraction 10. In some embodiments, the tracking cameras 64 utilize optical motion capture techniques to gather the information regarding the current position and/or orientation of the actuatable object 12. For example, a type or configuration of the tracking cameras 64 may be individually selected to correspond to a type of the trackers 60. To summarize, when using active devices as the trackers 60, the tracking cameras 64 may be designed to detect optical signals from the active devices to sense the position of the actuatable object 12. When using passive devices as the trackers 60, the tracking cameras 64 may be designed to detect optical signals from the passive devices on the multiple surfaces 21 of the amusement attraction 10. The positioning of these trackers 60 within the amusement attraction 10, and the positioning of the tracking cameras 64 onboard the actuatable object 12, in conjunction with geometric or skeletal models of the actuatable object 12, facilitates coordination of the projected images 14 onto the actuatable object 12 in different positions and orientations. In certain embodiments, the tracking cameras 64 may generate tracking signals that may be based on the detection of the optical signals from the trackers 60, and the tracking cameras 64 may be configured to output the generated tracking signals to the object controller 102.

In an embodiment, the set of trackers 60 may be time and/or frequency division multiplexed or intensity modulated to permit correlation of a detected signal to an individual tracker 60 and, therefore, to a particular position and/or orientation of the actuatable object 12 in the attraction 10. In an embodiment, the trackers 60 may be positioned with unique patterns relative to one another to permit identification of a signal characteristic of detecting a particular pattern and associated position and/or orientation of the actuatable object 12.

In the illustrated embodiment, the actuatable object 12 includes the IMU 108 that is disposed within the actuatable object 12. As discussed in more detail below, the IMU 108 may be fixed to a rigid element within the actuatable object 12, such that changes in position or otherwise associated motion experienced by the actuatable object 12 is simultaneously experienced by the IMU 108. In some embodiments, the IMU 108 may include multiple kinematic sensors (e.g., 3-axis accelerometer, 3-axis gyroscope, magnetometers, etc.) that are configured to detect the motion, position, and/or orientation of the actuatable object 12 and record sensor data that corresponds to the detected motion and/or position. Further, the IMU 108 may be configured to convert the detected sensor data into motion data that may be received by the object controller 102. Additionally or alternatively, the IMU 108 may communicatively couple with the object controller 102, thereby enabling the object controller to receive the motion data. Also, the actuatable object 12 may include sensors 110 that are disposed on or within the actuatable object. As discussed in more detail below, the sensors 110 may include a light sensor and/or a calibration sensor, as well as other sensors that may be suitable for detecting motion of the actuatable object 12, as well as detecting an amount or intensity of light received from the projector 16.

The media control system 20 may include the projector 16 of the projection system, and/or a media controller 112. The media controller 112 may be communicatively coupled to the data sources 70 (e.g., via the network device 90), thereby enabling the media controller 112 to dynamically react to the interactive data 109 and/or to the other changes in the amusement attraction 10. In an embodiment, the media control system 20 may be communicatively isolated from the motion control system 50. That is, the motion control system 50 may be independent from the media control system 20. Thus, the media control system 20 provides operational freedom to the actuatable object 12 for adaptively responding to the interactive data 109 in substantially real-time (e.g., within microseconds or milliseconds of an interaction or received signal), while the media control system 20 monitors or traces movements of the actuatable object 12 to project images 14 thereon in substantially real-time. As such, while the motion control system 50 performs an object feedback loop, the media control system 20 simultaneously performs a media feedback loop that modifies the images 14 that are projected onto the actuatable object 12.

The projector 16 may include a projector processor 120 and a projector memory 122 to facilitate the presentation of the images 14 onto the actuatable object 12. The projector processor 120 generally receives data indicative of the images 14 from the media controller 112, and then instructs a light source within the projector 16 to output the images through a lens. The projector 16 may be moveable or actuatable to follow and align with the actuatable object 12, such as based on commands received from the media controller 112. Alternatively, the projector 16 may be stationary. In any case, the media controller 112 may determine a current silhouette or a shape of a target portion of the actuatable object 12 that is to receive the projected images 14 based on an updated skeletal model, and then instruct the projector 16 to provide the images onto the silhouette. It should be understood that the projector 16 may therefore block off or mask out portions of the actuatable object 12 and/or amusement attraction 10 that are not designed to receive the images 14, such as a wig disposed on the head portion of the actuatable object 12, the scenery objects 26 behind the actuatable object 12 relative to the projector 16, and so forth.

The processors 100, 114, 120 are each any suitable processor that can execute instructions for carrying out the presently disclosed techniques, such as a general-purpose processor, system-on-chip (SoC) device, an application-specific integrated circuit (ASIC), a processor of a programmable logic controller (PLC), a processor of an industrial PC (IPC), or some other similar processor configuration. These instructions are encoded in programs or code stored in a tangible, non-transitory, computer-readable medium, such as the memories 104, 116, 122 and/or other storage circuitry or device. As such, the object processor 100 is coupled to the object memory 104, the media processor 114 is coupled to the media memory 116, and the projector processor 120 is coupled to the projector memory 122.

In embodiments, the media control system 20 may generate and update a skeletal model of the actuatable object 12 based on the signals and data received from the object controller 102. The skeletal model generally represents the moveable portions of the actuatable object 12, such as actuatable joints thereof, and is dynamically updated to represent a current three-dimensional position (e.g., including x, y, and z coordinates), orientation, and scale of the actuatable object 12 or portions thereof (e.g., a pose of the actuatable object). The media control system 20 therefore utilizes the skeletal model to generate the images for projection that precisely suit the current position and orientation of the actuatable object 12. The projection mapping system 8 also includes a motion control system that may be configured to move and actuate the actuatable object 12, such that the motion control system 50 and the media control system 20 function in tandem based on the mechanical position and orientation of the actuatable object 12. Further, the projection mapping system 8 may initiate a calibration routine configured to position the actuatable object 12 in multiple poses and/or positions within the amusement attraction 10, and project the images onto the external surface of the actuatable object 12. Based on the results of the calibration routine, the projection mapping system 8 may adjust or improve certain portions of the motion control system and/or the media control system. These two closed control loops of the projection mapping system 8 provide improved system performance based on the optical motion capture of the actuatable object 12 to deliver an engaging character presentation to guests, regardless of the mechanical positioning of the actuatable object 12.

Figure 3:
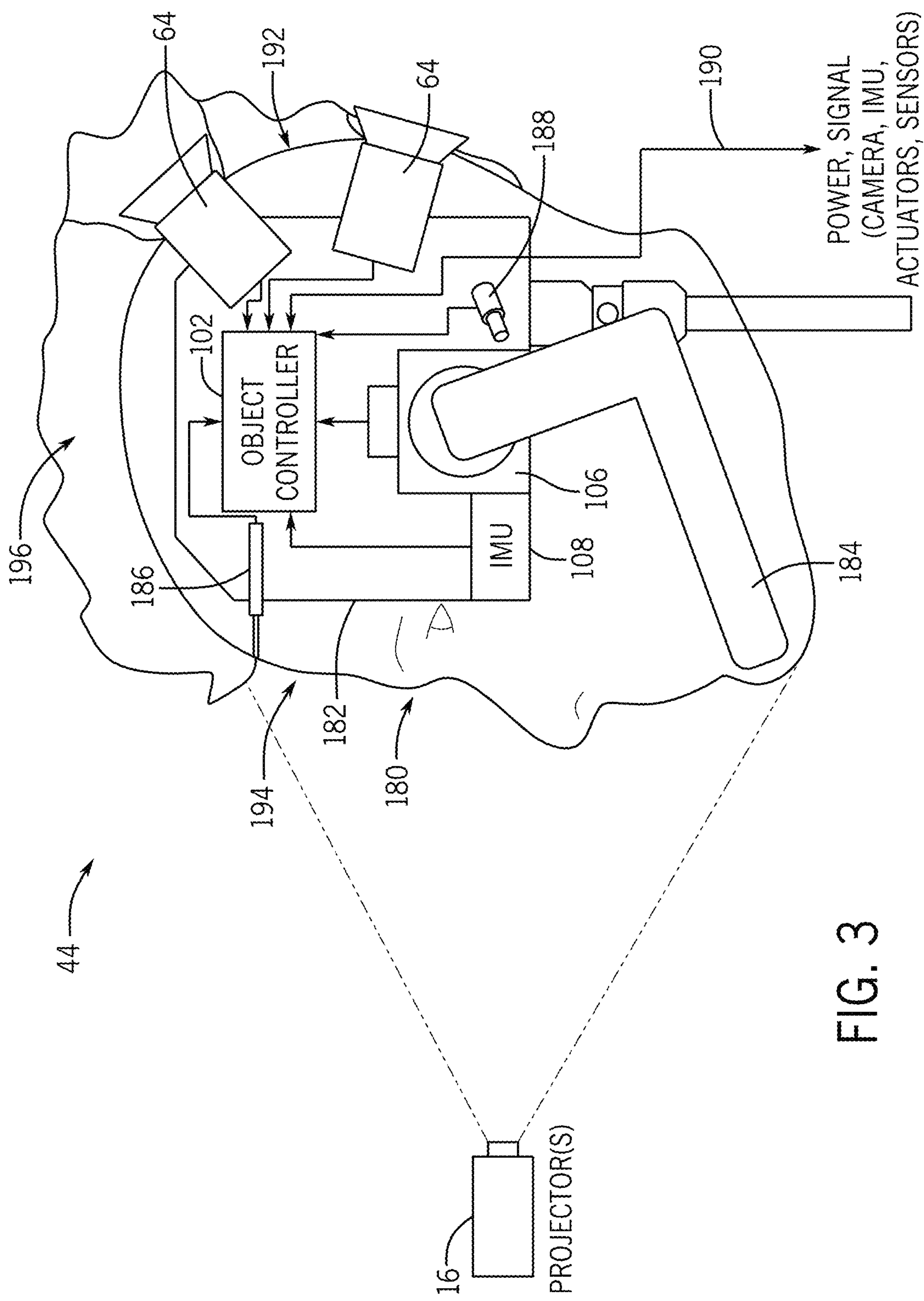
FIG. 3 is a cross-sectional schematic diagram of an embodiment of a head portion of an actuatable object with rear-mounted tracking cameras, in accordance with an embodiment of the present disclosure.

FIG. 3 illustrates a cross-sectional schematic diagram of an embodiment of a head portion 44 of the actuatable object 12 with rear-mounted tracking cameras 64, in accordance with an embodiment of the present techniques. The head portion 44 may include a first surface 192 and a second surface 194, such that the first surface 192 may be configured to provide a mounting location for the tracking cameras 64, and the second surface 194 may be configured to receive the projected images 14 from the projector 16. In some embodiments, the second surface 194 may face the guest area 32 and the guests 34, while in yet other embodiments, the head portion 44 may be configured to rotate such that either the first surface 192 or the second surface 194 may face the guest area 32 and the guests 34. In a non-limiting embodiment, the first surface 192 may be oriented to face in an opposite direction from the second surface 194. The tracking cameras 64 may be mounted to the head portion 44 such that the tracking cameras 64 are flush with the first surface 192. Additionally or alternatively, the head portion 44 may include one or more external features 196 configured to move relative to the actuatable object 12 to assume a configuration to at least partially obscure the tracking cameras 64. In the illustrated embodiment, the head portion 44 may be covered with an elastomeric deformable layer 180 that may be configured to resemble facial skin of a person. In other embodiments, the elastomeric deformable layer 180 may cover a portion (e.g., the first surface 192, the second surface 194 that receives the projected images 14, etc.) of the head portion 44, the entire head portion 44, or the entire actuatable object 12. Additionally or alternatively, the elastomeric deformable layer 180 may partially obscure the tracking cameras 64 from view of the guests 34 in the guest area 32. In other embodiments, the tracking cameras 64 may be obscured from view of the guests 34 by being disposed on the first surface 192 opposite the guest area 32 or obscuring the tracking cameras 64 within a wig and/or hair of the actuatable object 12. In some embodiments, the tracking cameras 64 may not be obscured from the guests 34, but may have lenses sized such that they are imperceptible by the guests 34 in the guest area 32.

In the illustrated embodiment, the head portion 44 includes a frame 182 disposed within the head portion 44. The frame 182 may provide a rigid structure configured to support various components and sub-components assembled within the head portion 44. For example, in the illustrated embodiment, the frame 182 provides support for the tracking cameras 64, the IMU 108, the object controller 102, one or more actuators 106, a jaw portion 184, and various sensors 110 (e.g., an optical sensor 186 and/or a calibration sensor 188). The frame 182 may be made from any suitable material, such as but not limited to metal, metal alloys, ceramics, carbon fiber compositions, polymeric compositions (e.g., plastic), wood, or any other suitable materials or combinations thereof. In some embodiments, the frame 182 provides for paths for signal conduits 190 (electrical power cables, communication signal cords, sensor output signal cables, etc.) to communicatively couple with the components housed in the frame 182. For example, the frame 182 may provide an aperture so the signal conduits 190 may enter and exit the frame 182. In some embodiments, the signal conduits 190 may be disposed within a single conduit cable.

In the illustrated embodiment, the IMU 108 is disposed in the frame 182 within the head portion 44 of the actuatable object 12. As discussed previously, the IMU 108 may be fixed to the frame 182 such that changes in position, motion, and/or orientation (e.g., the inertia of the actuatable object 12) may be additionally experienced by the IMU 108. In some embodiments, the IMU 108 may include multiple kinematic sensors (e.g., 3-axis accelerometer, 3-axis gyroscope, magnetometers, compass, etc.) that are configured to detect the motion, position, and/or orientation of the actuatable object 12 and record sensor data that corresponds to the detected motion, position and/or orientation. Additionally, the IMU 108 may be configured to measure and record the motion and position of the actuatable object 12 at a high frame rate, thereby enabling the IMU 108 to provide complementary inputs to the object controller 102. For example, in some embodiments, the IMU 108 may be configured to generate an orientation signal in response to changes in the orientation of the portion (e.g., head portion 44) of the actuatable object 12.

In certain embodiments, the head portion 44 may include one or more actuators 106 disposed within the frame 182. As discussed previously, the motion control system 50 may output instructions to the actuators 106 to actuate various portions (an arm portion, the head portion 44, etc.) of the actuatable object 12. The actuators 106 may include servo motors, hydraulic cylinders, linear actuators, and so forth that are each positioned and coupled to develop relative motion between respective portions of the actuatable object 12. In the illustrated embodiment, the actuator 106 disposed on the frame 182 is coupled to a jaw portion 184, and may be configured to actuate the jaw portion 184 according to instructions received from the object controller 102. For example, the actuator 106 may be configured to actuate the jaw portion 184 to mimic or realistically portray a speaking (e.g., talking, shouting, whispering, singing, etc.) motion. In some embodiments, the actuator 106 may communicatively couple with the object controller 102, and additionally may receive electrical power from one or more signal conduits 190.

In a non-limiting embodiment, the head portion 44 may include one or more sensors 110 configured to gather data corresponding to the operation and movement of the actuatable object 12. For example, in one embodiment, the head portion 44 may include an optical sensor 186 that may include a fiber optic light guide or an ambient light sensor (ALS). The optical sensor 186 may be mounted to the frame 182 and communicatively coupled to the object controller 102. In some embodiments, the optical sensor 186 may additionally protrude through the second surface 194 of the head portion 44 and may be configured to receive light (e.g., from the ambient environment, from the projector 16, from the stage lighting devices 30, etc.). The optical sensor 186 may be positioned on the second surface 194 within an optical aperture that may enable the optical sensor 186 to receive the aforementioned light. In some embodiments, the optical sensor 186 and the associated optical aperture may be small (e.g., one pixel in diameter) and placed at an inconspicuous position on the second surface 194 (e.g., a hairline of the head portion), thereby effectively limiting the view of the optical sensor 186 and the aperture to the guests 34. Additionally or alternatively, the optical sensor 186 may generate a signal that is based on the received light at the optical sensor 186. In certain embodiments, the optical sensor 186 may be configured to receive light from only one direction (e.g., a one-way optical sensor). In a non-limiting embodiment, the optical sensor 186 may not include a light emitter. In this way, the optical sensor 186 may output the generated signal to the object controller 102.

Further, the one or more sensors 110 may include a calibration sensor 188 disposed within the frame 182 of the head portion 44. As discussed previously with the IMU 108, the calibration sensor 188 may be fixed to the frame 182 such that any perceived motion or changes in position and/or orientation of the head portion 44 of the actuatable object 12 is additionally experienced by the calibration sensor 188. The calibration sensor may be communicatively coupled to the object controller 102, and may be configured to output a position signal that corresponds to the position, motion, and/or orientation of the head portion 44. In some embodiments, the calibration sensor 188 may be fixed to a portion of the frame 182 that is opposite to the portion of the frame where the IMU 108 is mounted. In the illustrated embodiment, the calibration sensor is disposed on the frame 182 proximate to where a corresponding ear canal would be positioned within a human skull to conceal the calibration sensor 188 from view of the guests 34. However, any suitable mounting location of the calibration sensor 188 is considered within the scope of the various embodiments of the present techniques.

Figure 4:
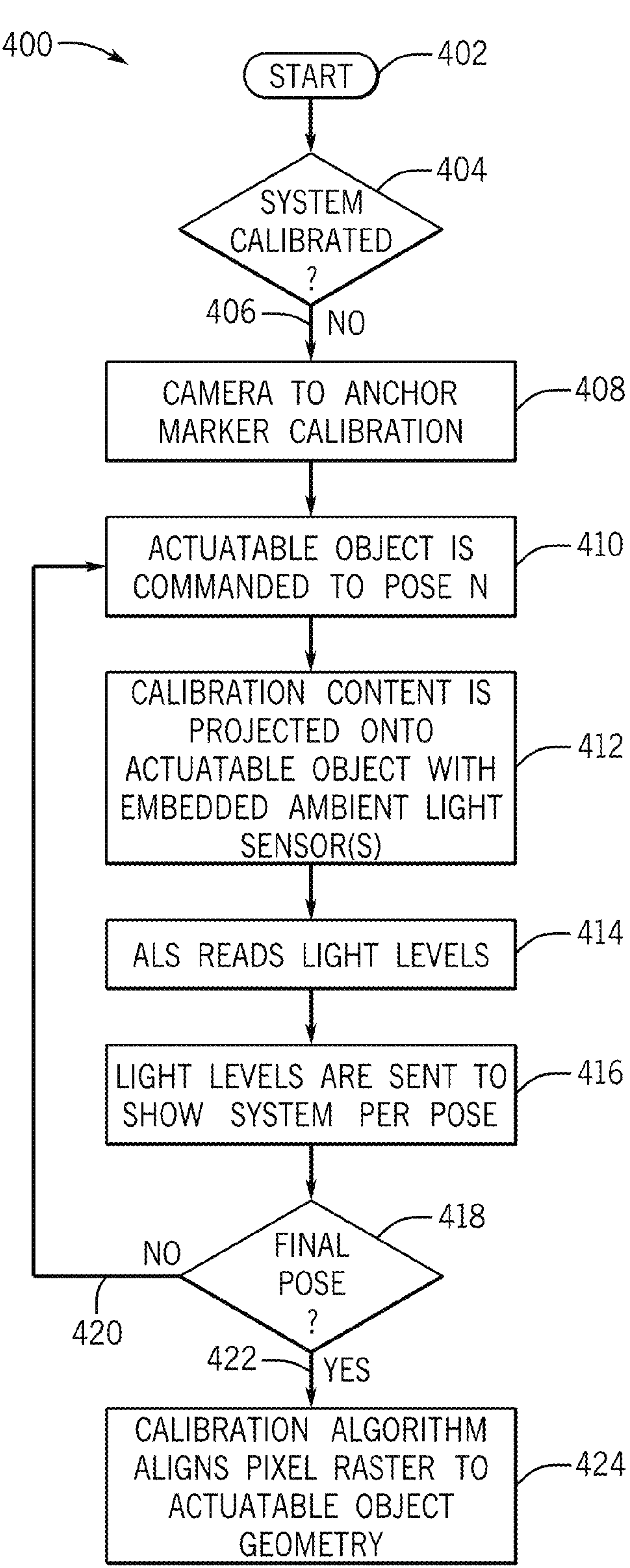
FIG. 4 is a flow diagram of an embodiment of a process for the projection mapping system to calibrate the motion tracking system and the projection system, in accordance with embodiments of the present disclosure.

FIG. 4 illustrates a flow diagram of an embodiment of a process 400 for the projection mapping system 8 to calibrate the motion control system 50 and the projection system. The process 400 may be representative of initiated code or instructions stored in a non-transitory computer-readable medium (e.g., the media memory 116) and executed, for example, by the media processor 114 of the media controller 112 of the media control system 20. It should be understood that the media processor 114 may be communicatively coupled to other components of the projection mapping system 8 via a network, such as a network device 90, to receive and send the instructions and signals described below.

The process 400 initiates at block 402. At block 404, media controller 112 may determine whether the projection mapping system 8 is calibrated. In some embodiments, if the projection mapping system 8 is already calibrated, the media controller 112 may pass over the following description of the process 400, and continue to the process 500 discussed below in FIG. 5. However, if the projection mapping system 8 determines that it is not calibrated, as in branch 406, the projection mapping system 8 may initiate the calibration process.

In block 408, a relationship (e.g., physical or 3D space relationship) between the one or more tracking camera(s) 64 and the one or more tracker(s) 60 may be established. In some embodiments, the relationship between the tracking camera 64 and the tracker(s) 60 may be established by actuating the actuatable object 12 until a tracker 60 comes into a field of view (FOV) of the tracking camera 64. Once the tracker 60 enters the FOV of the tracking camera, the relationship between the tracking camera 64 and the tracker 60 may be initiated as part of calibration.

At block 410, the actuatable object 12 is sent instructions from the media controller 112 to initiate a first pose. In some embodiments, the object controller 102 disposed on the actuatable object 12 may receive the instructions from the media controller 112, and output the instructions to the actuators 106 to move the actuatable object into the first pose. As a result, the motion control system 50 may additionally activate the actuatable motion device 66 coupled to the actuatable object 12 to move the actuatable object 12 to a position of the amusement attraction 10 associated with the first pose.

At block 412, calibration content (e.g., projected images 14, light from the projector 16, etc.) may be projected onto the actuatable object 12. In certain embodiments, the calibration content may be projected onto the head portion 44 of the actuatable object 12 at least on the portion of the second surface 194 that houses the optical sensor 186. The media controller 112 may determine that the actuatable object 102 is positioned in the first pose and output instructions to the projector 16 of the projection system to output calibration content associated with the first pose. At block 414, the optical sensor 186 may receive the calibration content from the projector 16, and the optical sensor 186 may sense the light level from the projected calibration content. In some embodiments, the optical sensor 186 may record the sensed light level from the projected calibration content, and output the sensed light level to the object controller 102. As a result, by receiving the calibration content at the optical sensor 186 via the projector 16, the media controller 112 may determine a spatial relationship between the projected images 14 (e.g., projected 2D pixels) and the actuatable object 12.

At block 416, the object controller 102 may output the sensed light level to the media controller 112. The media controller 112 may receive the output sensed light levels from the object controller 102 and determine whether the relationship between the projected images 14 and a position of the optical sensor 186 has been properly established (e.g., mapping 2D pixels from the projector 16 to a 3D object). For example, the media controller 112 may determine whether the light levels were at an appropriate intensity, whether the projected images 14 properly matched the physical geometry of the target actuatable object 12 positioned in the first pose, and other suitable checks.

At block 418, the media controller 112 determines whether the pose actuated by the motion control system 50 and the actuatable object was the final pose in the calibration process 400. In some embodiments, the calibration process 400 may include multiple (e.g., 2, 3, 4, 5, 6, 7, 8, etc.) poses. If the media controller 112 determines that the pose just completed is not the final pose (branch 420), then the process repeats steps 410-416 for the next pose in the calibration process 400. If the media controller 112 determines that the pose just completed is the final pose (branch 422), then the process proceeds to block 424.

At block 424, the media controller 112 generates a calibration algorithm to align the projected images 14 onto the actuatable object 12. In other words, the media controller 112 may synthesize the determined position of the actuatable object 12 in 3D space (based on completing step 408) with the determined spatial relationship between the images 14 from the projector 16 and the actuatable object 12 (based on completion of step 414). For example, the media controller 112 may determine that the projector 16 may output a different level of light as part of the projected images 14, may determine that the actuatable object 12 may translate a determined length further in one direction to properly receive the projected images 14, or otherwise suitable adjustments. The media controller 112 may implement any appropriate adjustments to complete the calibration process 400. Once the media controller 112 implements any appropriate adjustments, the projected images 14 from the projector 16 may then appropriately "stick" to the actuatable object 12 as it moves (e.g., via output commands from the motion control system 50) through 3D space within the entertainment venue.

Figure 5:
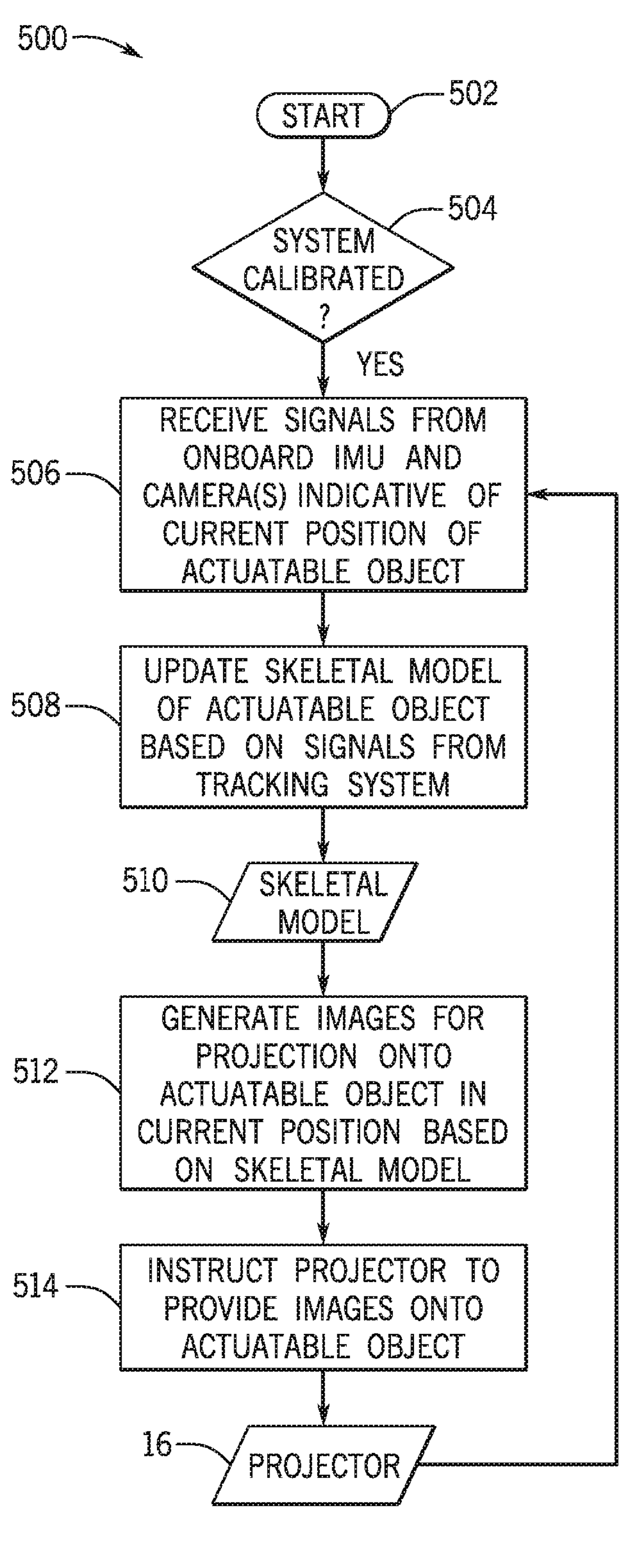
FIG. 5 is a flow diagram of an embodiment of a process for the projection mapping system to dynamically project images onto the actuatable object of FIGS. 1-3, in accordance with aspects of the present disclosure.

FIG. 5 illustrates a flow diagram of an embodiment of a process 500 for the media control system 20 to dynamically map images 14 onto the actuatable object 12 for a calibrated system. As mentioned with respect to the process 400 of FIG. 4, the steps of process 500 are not limiting. The process 500 may be representative of initiated code or instructions stored in a non-transitory computer-readable medium (e.g., the media memory 116) and executed, for example, by the media processor 114 of the media controller 112 of the media control system 20. It should be understood that the media processor 114 may be communicatively coupled to other components of the projection mapping system 8 via a network, such as a network device 90, to receive and send the instructions and signals described below.

The process 500 initiates at block 502. At block 504, the media controller 112 may determine whether the projection mapping system 8 is calibrated. In some embodiments, if the projection mapping system 8 is not calibrated, the media controller 112 may perform the calibration process as discussed in more detail above in relation to FIG. 4 and the process 400. If the projection mapping system 8 is calibrated, at block 506 the media controller 112 may receive signals (e.g., sensor feedback) from the object controller 102 that are indicative of a current pose (e.g., current position, current orientation, etc.) of the actuatable object 12. The media controller 112 may receive the signals from the object controller 102 though the network device 90, which facilitates efficient computations within the media controller 112. As noted above, the actuatable object 12 includes the tracking cameras 64 concealed thereon or therein, and the object controller 102 may enable the tracking cameras 64 to identify the trackers 60 disposed within the amusement attraction 10. By identifying the trackers 60 via the tracking cameras 64, the object controller 102 may identify a current pose of the actuatable object 12, without receiving or relying on position, velocity, and/or acceleration information from the actuators 106 or IMU 108 of the actuatable object 12. However, as noted previously, in some embodiments the object controller 102 may combine inputs received from the IMU 108, the sensors 110, and the tracking cameras 64 to identify the current position and/or orientation of the actuatable object 12. In combination with an efficient scanning rate of the tracking cameras 64, data provided by the IMU 108, and a frame rate of the projector 16, such a configuration enables the actuatable object 12 to react to the interactive data 109 with reduced latency or lag, thereby more closely resembling a live character or person.

The media controller 112 may receive position, velocity, and/or acceleration information from the object controller 102, which the media controller 112 may leverage to verify the detected pose of the actuatable object 12. Indeed, the media controller 112 may predict future actions of the actuatable object 12 based on the received position information, thereby according a lead-time to the media controller 112 for generating the projectable images 14. The media controller 112 operating predictively may generate multiple sets of images 14, each corresponding to a particular future interactive response of the actuatable object 12. As such, the media controller 112 may therefore select one of the sets of projected content that was previously generated, enabling the media control system 20 to instantaneously provide the appropriate images (e.g., textures) when a given course of action of the actuatable object 12 is realized.

At block 508, the media controller 112, performing the process 500, updates a skeletal model 510 of the actuatable object 12 based on the signals from the object controller 102. The skeletal model 510 may include any suitable data structure and/or statistical model maintained in the media controller 112 to represent the moveable or actuatable portions of the actuatable object 12, as well as the current position and orientation of the actuatable portions. As such, the media controller 112 may continuously update the skeletal model 508 to represent the actual, current pose (e.g., position and/or orientation) of the actuatable object 12.

In certain situations in which a particular actuatable joint or portion of the actuatable object 12 is non-operational, the media controller 112 may update the skeletal model 510 to indicate a non-operational status of the particular actuatable portion, while reacting to the current position of the actuatable object 12 relative to the trackers 60 to enable the images 14 to be adaptively fit to the partially non-operational actuatable object 12. That is, in such situations, the media controller 112 performing the process 500 may generate suitable images 14 that correspond to the actual pose of the actuatable object 12, thereby ensuring an appropriate set of images 14 are generated for the non-operational portions of the actuatable object 12. In contrast, certain projection mapping systems following pre-programmed scenes (e.g., via canned media) may project images onto the expected position of a given moveable portion of a traditional animated figure, thereby detracting from guest experience when the given moveable portion becomes non-operational, as the images do not match the traditional actuatable object, or vice versa.

Therefore, at block 512, the media controller 112 generates data indicative of the images 14 to be projected onto the actuatable object 12 having the current pose based on the skeletal model 510. In contrast to predetermined or canned images, the images 14 are generated in-situ or in real time to particularly correspond to a current state or pose of the actuatable object 12. Additionally, the data indicative of the images 14 and/or the current pose of the actuatable object 12 may be stored in the media memory 116 for a predetermined time period.

At block 514, the media controller 112 additionally instructs the projector 16 to provide (e.g., contour map) the images 14 onto the actuatable object 12 having the current pose. As recognized herein, the media control system 20 implements contour mapping or contour-focus mapping with the skeletal model 510 to direct the selectively designed images 14 onto targeted portions of the actuatable object 12 in a lifelike manner. For example, the media controller 112 may generate, and instruct the projector 16 to output the images 14 that are tuned to the particular position and orientation of the actuatable object 12, thereby generating a contour mapped set of textures that are precisely focused to the particular spatial positioning of the actuatable object 12. The media controller 112 may inherently provide the instructions of block 514 by transmitting the data indicative of the images 14 to the projector 16 without a separate instruction signal, thereby further limiting latency of the media control system 20. As such, the components of the media control system 20 cooperate to adaptively analyze the actuatable object 12 and dynamically fit the images 14 onto an instantaneous pose of the actuatable object 12, which may be reacting to the data sources 70 and/or interacting with the guests 34 at any given time. The media controller 112 may therefore return to block 506 to continue receiving sensor signals and continue performing the process 500.

Moreover, the media control system 20 may monitor performance and or health of the actuatable object 12. For example, it is presently recognized that the media control system 20 may perform health monitoring of the actuatable object 12 based on the determined performance of the actuatable object 12 over time. That is, if a particular set of images was projected onto the actuatable object 12 at a particular time point during a show cycle (e.g., a baseline performance assessment), and after a period of time, the media control system 20 adjusted (e.g., displaced) the set of images for the particular time point in a later show cycle by more than a threshold adjustment (e.g., current performance assessment), the media control system 20 may generate an alert indicative of the difference between the iterations of the show cycle. For example, if the head portion 44 of the actuatable object 12 is unintentionally modified or degraded such that a jaw of the actuatable object 12 is moving erratically, the media control system 20 may alert an operator to the degradation. As another example, if a particular portion of the actuatable object 12 moved during a first show cycle, such as a tilt or rotation of the head portion 44, but is stationary during a second show cycle (e.g., corresponding to a modified skeletal model 510), the media control system 20 may output an alert indicative of a non-operational portion of the actuatable object 12. In these situations, the media controller 112 may output an alert indicative of the degraded status and/or sensed, uncharacteristic behavior. In some cases, the projection mapping system 8 may be designed to stop operation of the media control system 20 and/or the motion control system 50 in response to the alert. In other cases, in response to determining that the performance of the actuatable object 12 is only marginally affected (e.g., has a skeletal model deviation that is more than a first threshold and less than a second, higher threshold), the media controller 112 may provide the alert and continue cycling through the process 500. In a non-limiting embodiment, the media control system 20 may initiate the calibration process 400 outlined in above in relation to FIG. 4 to address the perceived differences between the images 14 outputted by the projector 16 and the position, motion, and/or orientation of the actuatable object 12. Therefore, it should be understood that the present media control system 20 may operate as a quality assessment tool that quantifies the performance of the motion control system 50 and the actuatable object 12 over time.

As such, technical effects of the disclosed projection mapping system include a motion control system with an actuatable object that dynamically reacts to interactive data to deliver an engaging and realistic experience to amusement attraction guests. Also, the actuatable object includes tracking cameras mounted on the object that are configured to use optical motion tracking techniques to determine a position, motion and/or orientation of the actuatable object relative to trackers fixed to various surfaces in the amusement attraction. Placing the cameras on the actuatable object and the trackers on the various surfaces of the attraction facilitates and expedites set up, maintenance, and calibration processes of the projection mapping system. Additionally, the actuatable object combines the optical motion tracking with the tracking cameras with data gathered by an inertial measurement unit to more precisely determine a position of the actuatable object within the amusement attraction. Further, during calibration of the system, the actuatable object may use an ambient light sensor that may utilize a relatively small surface area of an external surface of the actuatable object to measure and determine light levels in the ambient environment, as well as light levels of the projected images from the projector. Using this "inside-out" motion tracking technique combined with the improved calibration processes, the projection mapping system may instruct the projector to projection map the images onto the external surface of the actuatable object in real-time, thereby presenting an immersive and engagingly-lifelike animated figure for improved guest enjoyment with improved realism, up-time, and/or reliability.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A projection mapping system, comprising:

a plurality of trackers;

an actuatable object comprising:

a frame;

one or more actuators configured to actuate a portion of the actuatable object;

a plurality of sensors on or in the portion of the actuatable object and configured to move with the portion during actuation, wherein the plurality of sensors comprises:

a plurality of tracking cameras positioned on a first surface of the portion of the actuatable object, wherein the plurality of tracking cameras are configured to detect optical signals of one or more of the plurality of trackers and to generate tracking signals indicative of detection of the one or more of the plurality of trackers;

an inertial measurement unit (IMU) sensor, wherein the IMU sensor is coupled to the frame, and wherein the IMU sensor is configured to generate an orientation signal in response to changes in orientation of the portion of the actuatable object;

a one-way optical sensor positioned on a second surface of the portion of the actuatable object and configured to generate a signal indicative of light received at the second surface;

one or more external features configured to move relative to the actuatable object to assume a configuration to at least partially obscure one or more of the plurality of tracking cameras; and an object controller configured to:

transmit signals from the plurality of sensors, the signals comprising the tracking signals, the orientation signal, and the light signal; and receive instructions to actuate the portion of the actuatable object;

a system controller configured to:

receive the signals from the plurality of sensors;

determine a position of the portion of the actuatable object based on the signals; and generate projection instructions based on the determined position; and a projector communicatively coupled to the system controller, wherein the projector is configured to project images onto the second surface of the portion of the actuatable object based on the projection instructions.

2. The projection mapping system of claim 1, wherein the second surface is oriented opposing the first surface.

3. The projection mapping system of claim 1, wherein the portion of the actuatable object comprises a moveable subsection that moves relative to the frame, and wherein the IMU is fixed to the frame and does not move with the moveable subsection.

4. The projection mapping system of claim 1, wherein the one-way optical sensor does not comprise a light emitter.

5. The projection mapping system of claim 4, wherein the one-way optical sensor comprises one or both of a fiber optic light guide or an ambient light sensor.

6. The projection mapping system of claim 5, wherein the one-way optical sensor is configured to receive light from the projected images.

7. The projection mapping system of claim 1, wherein the one or more actuators comprise a servo motor, a hydraulic cylinder, a linear actuator, or a combination thereof.

8. The projection mapping system of claim 1, wherein the plurality of tracking cameras positioned on the first surface are shielded from receiving light from the projected images.

9. An actuatable object, comprising:

a frame;

one or more actuators configured to actuate a portion of the actuatable object;

a plurality of sensors on or in the portion of the actuatable object and configured to move with the portion during actuation, wherein the plurality of sensors comprises:

a plurality of tracking cameras positioned on a first surface of the portion of the actuatable object, wherein the plurality of tracking cameras are configured to detect optical signals of one or more of a plurality of trackers and to generate tracking signals;

an inertial measurement unit (IMU) sensor, wherein the IMU sensor is coupled to the frame, and wherein the IMU sensor is configured to generate an orientation signal in response to changes in orientation of the portion of the actuatable object; and a one-way optical sensor positioned on a second surface of the portion of the actuatable object and configured to generate a signal indicative of light received at the second surface, wherein the one-way optical sensor comprises one or both of a fiber optic light guide or an ambient light sensor;

one or more external features configured to move relative to the actuatable object to assume a configuration to at least partially obscure one or more of the plurality of tracking cameras; and an object controller configured to:

transmit signals from the plurality of sensors, the signals comprising the tracking signals, the orientation signal, and the light signal; and receive instructions to actuate the portion of the actuatable object.

10. The actuatable object of claim 9, wherein the portion of the actuatable object comprises a moveable subsection that moves relative to the frame.

11. The actuatable object of claim 10, wherein the IMU and the one-way optical sensor are fixed to the frame and do not move with the moveable subsection.

12. The actuatable object of claim 9, wherein the object controller is configured to communicatively couple to the IMU, the plurality of sensors, and the one or more actuators.

13. A processor-implemented method, comprising:

receiving signals from a plurality of sensors mounted on an actuatable object, wherein the plurality of sensors comprise:

a plurality of tracking cameras configured to generate a plurality of tracking signals;

an inertial measurement unit (IMU) configured to generate an orientation signal; and a one-way optical sensor configured to generate signals indicative of light received, wherein the one-way optical sensor is configured to receive light from projected images;

determining a position of a portion of the actuatable object, wherein the determination is based on the received signals, wherein the plurality of tracking signals of the received signals are based on a relationship between the tracking cameras and trackers mounted within an amusement attraction, and wherein the actuatable object comprises one or more external features configured to move relative to the actuatable object to assume a configuration to at least partially obscure one or more of the plurality of tracking cameras;

generating projection instructions based on the determined position; and transmitting the projection instructions to a projector, wherein the projector is configured to project the images onto a surface of the actuatable object based on the projection instructions.

14. The processor-implemented method of claim 13, wherein the one-way optical sensor does not comprise a light emitter.

15. The processor-implemented method of claim 14, wherein the one-way optical sensor comprises one or both of a fiber optic light guide or an ambient light sensor.

16. The processor-implemented method of claim 13, wherein the actuatable object comprises one or more actuators configured to actuate the portion of the actuatable object.

17. The processor-implemented method of claim 13, wherein the plurality of tracking cameras positioned on the actuatable object are shielded from receiving light from the projected images.

* * * * *